Patented Aug. 27, 1940

2,212,644

UNITED STATES PATENT OFFICE 2,212,644

HYDROCARBON OIL

Clarence M. Loane, Hammond, Ind., assignor to Standard Oil Company, Chicago, Ill., a corporation of Indiana No Drawing. Application December 5, 1936,
Serial No. 114,433

10 Claims. (Cl. 23—250)

This invention relates to the method of preventing the development of rancid, undesirable, and foreign tastes in highly refined paraffin oils, namely, white oils.

White oils, which are used in drugs, food products, coatings for paper, etc., develop a rancid taste or undesirable odors during storage in the presence or absence of light. This deterioration greatly impairs the utility of white oils. It is the purpose of the present invention to treat these white oils with small amounts of certain acids in order to prevent the aforesaid deterioration.

White oils may be prepared by several processes but, as a rule, it is prepared by treating a batch of mineral oil several times with concentrated or fuming sulfuric acid. The acid treated oil is then completely neutralized, promptly after the acid treatment, with caustic or some alkaline material. These highly refined white oils may have different viscosities, generally from 80 to 400 seconds Saybolt at 100° F. The oil is generally colorless or pearl white. Also, these white oils may be prepared with the aid of selective solvents.

I have discovered that by using as little as ½ to 1 part of certain acids in one million parts of white oil, I can prevent the formation of rancid taste and undesirable odors therein over long periods of time. I prefer to use these acids in amounts ranging from 1 to 50 parts in one million parts of white oil, however, as much as 75 to 100 parts of the acids may be added to the white oil.

The acids which may be used to stabilize these white oils are sulfuric acid, chlor-sulfonic acid and mono-alkyl sulfuric acids. Examples of the mono-alkyl sulfuric acids are methyl, ethyl, propyl, butyl and amyl sulfuric acids. The mono-alkyl sulfuric acids of higher molecular weight may also be used. In using chlor-sulfonic acid in the stabilization of white oils, I prefer to use concentrations within the range of 1 to 50 parts per one million parts of white oil.

My invention is particularly useful in storing white oils for a long period of time. If the white oil is to be used in an art where very slightly acidified oil is undesirable, the oil may be treated with a small amount of an aqueous caustic solution in order to remove the trace of acid before use. My invention is also very useful in stabilizing white oils which are to be shipped for long distances or for treating oils that will be stored for long periods of time. For example, when white oils are shipped to foreign countries, the oil is subjected to many conditions which are favorable to the formation of undesirable odor and color formation. My invention is particularly useful in treating such oils before shipment in order to avoid the deterioration herein mentioned. When such oils reach their destination or before they are used, they may be treated with an aqueous solution of caustic or ammonia in order to remove the small amount of acid present.

While I have described my invention with respect to specific examples, it should be understood that my invention is not limited except by the following claims.

I claim:

1. The method of preventing the development of undesirable odor in white oils which comprises dissolving in about one million parts of said oil from ½ to 100 parts of an acid selected from the group consisting of sulfuric acid, chlor-sulfonic acid and a mono-alkyl sulfuric acid.

2. The method of preventing the development of undesirable odor in white oils during storage which comprises dissolving in about one million parts of said oil from 1 to 50 parts of an acid selected from the group consisting of sulfuric acid, chlor-sulfonic acid and a mono-alkyl sulfuric acid.

3. The method of preventing the development of undesirable odor in white oils which comprises dissolving in about one million parts of said oil from ½ to 20 parts of an acid selected from the group consisting of sulfuric acid, chlor-sulfonic acid and a mono-alkyl sulfuric acid.

4. A new composition of matter consisting substantially entirely of white oil and from 1 to 50 parts of an acid selected from the group consisting of sulfuric acid, chlor-sulfonic acid and a mono-alkyl sulfuric acid in about one million parts of the white oil.

5. A method of preventing the development of undesirable odor in white oils which comprises dissolving in about one million parts of said oil from ½ to 100 parts of sulfuric acid.

6. The method of preventing the development of undesirable odor in white oils which comprises dissolving in about one million parts of said oil from ½ to 50 parts of chlor-sulfuric acid.

7. The method of preventing the development of undesirable odor in white oils which comprises dissolving in about one million parts of said oil from 1 to 100 parts of a mono-alkyl sulfuric acid.

8. A new composition of matter consisting substantially entirely of white oil and from 1 to 75 parts of sulfuric acid in about one million parts of said white oil.

9. A new composition of matter consisting substantially entirely of white oil and from 1 to 50 parts of chlor-sulfonic acid in about one million parts of said white oil.

10. A new composition of matter consisting substantially entirely of white oil and from 1 to 100 parts of a mono-alkyl sulfuric acid dissolved in about one million parts of said white oil.

CLARENCE M. LOANE.

CERTIFICATE OF CORRECTION.

Patent No. 2,212,644.  August 27, 1940.

CLARENCE M. LOANE.

It is hereby certified that error appears in the printed specification of the above numbered patent requiring correction as follows: Page 1, second column, line 49, claim 6, for "chlor-sulfuric" read --chlor-sulfonic--; and that the said Letters Patent should be read with this correction therein that the same may conform to the record of the case in the Patent Office.

Signed and sealed this 1st day of October, A. D. 1940.

(Seal)

Henry Van Arsdale,
Acting Commissioner of Patents.

CERTIFICATE OF CORRECTION.

Patent No. 2,212,644. August 27, 1940.

CLARENCE M. LOANE.

It is hereby certified that error appears in the printed specification of the above numbered patent requiring correction as follows: Page 1, second column, line 49, claim 6, for "chlor-sulfuric" read --chlor-sulfonic--; and that the said Letters Patent should be read with this correction therein that the same may conform to the record of the case in the Patent Office.

Signed and sealed this 1st day of October, A. D. 1940.

(Seal)

Henry Van Arsdale,
Acting Commissioner of Patents.